United States Patent [19]

Taylor

[11] Patent Number: 4,660,816

[45] Date of Patent: Apr. 28, 1987

[54] CLAMPING DEVICE

[76] Inventor: Robert E. Taylor, R.R. #1, Minburn, Iowa 50167

[21] Appl. No.: 799,304

[22] Filed: Nov. 18, 1985

[51] Int. Cl.[4] .............................................. B25B 1/04
[52] U.S. Cl. .................................................... 269/238
[58] Field of Search ................. 81/300, 302, 342, 350, 81/352, 385, 388, 389, 395, 422; 269/237, 238, 239, 257, 283, 69, 240; 254/122

[56] References Cited

U.S. PATENT DOCUMENTS

| | | | |
|---|---|---|---|
| 188,408 | 3/1877 | Quirk | 81/352 |
| 698,162 | 4/1902 | Weibezahl | 81/352 |
| 2,168,812 | 8/1939 | Van Keuren | 81/302 |
| 2,373,478 | 4/1945 | Kuhn | 254/122 |
| 2,454,309 | 11/1948 | Davis | 81/342 |
| 3,446,102 | 5/1969 | Hallmark | 81/422 |

FOREIGN PATENT DOCUMENTS 2049924  4/1972  Fed. Rep. of Germany ........ 81/302

Primary Examiner—Robert C. Watson
Attorney, Agent, or Firm—Zarley, McKee, Thomte, Voorhees & Sease

[57] ABSTRACT

A clamping device including a pair of counter-opposing angularly shaped beams each having a forward jaw portion and a rearward portion interconnected by a pair of connecting straps and a force exerting element. Each connecting strap is pivotally attached at one end to a forward jaw portion of one beam and the rearward portion of the other beam. The point of intersection of the connecting straps moves progressively closer to the workpiece held between the jaws as the jaws are closed and exert simultaneously equal forces ont the workpiece. In one embodiment the clamping device is adapted for use as a portable tire bead breaker suitable for use on large truck or tractor tires.

1 Claim, 15 Drawing Figures

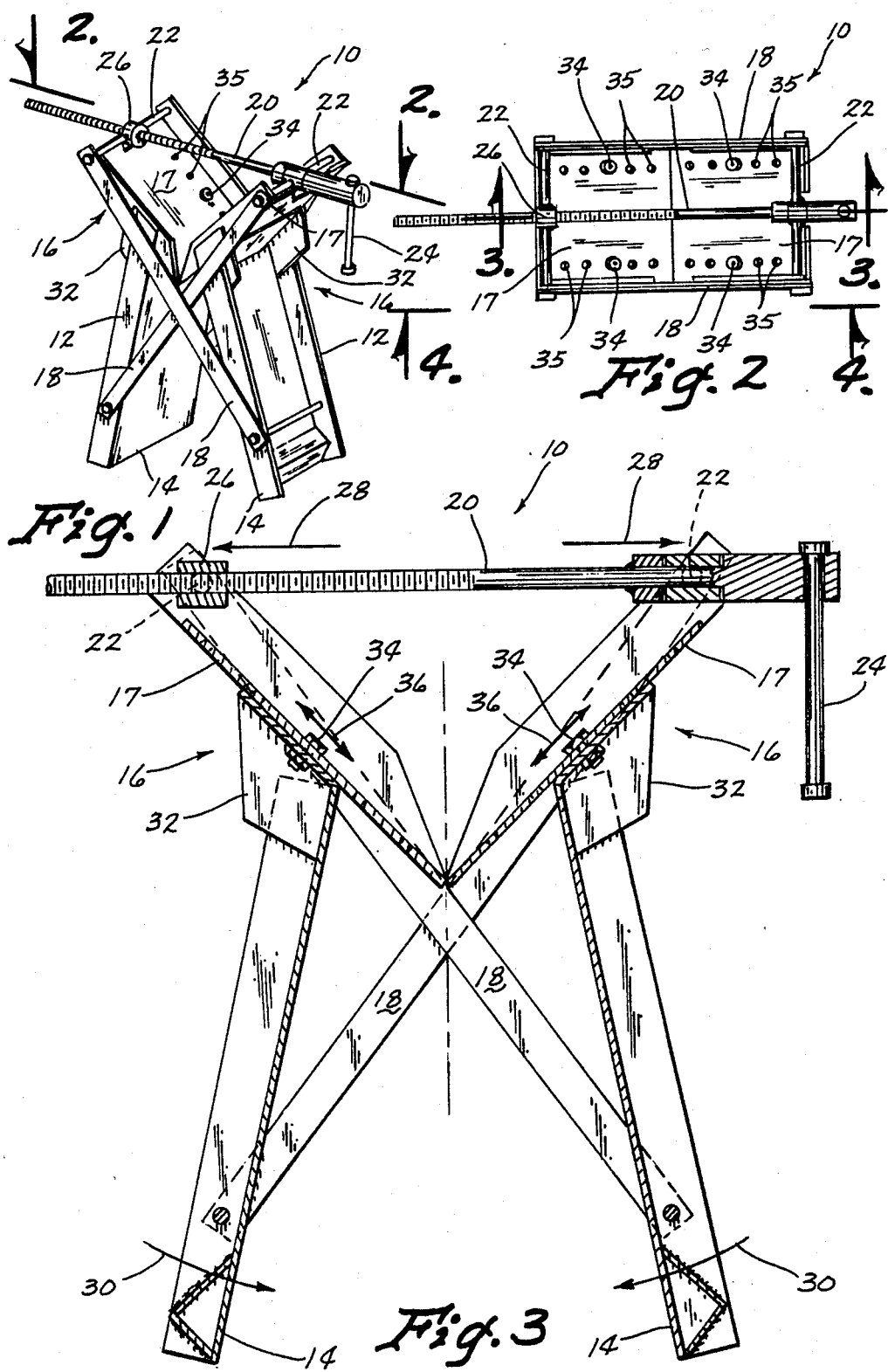

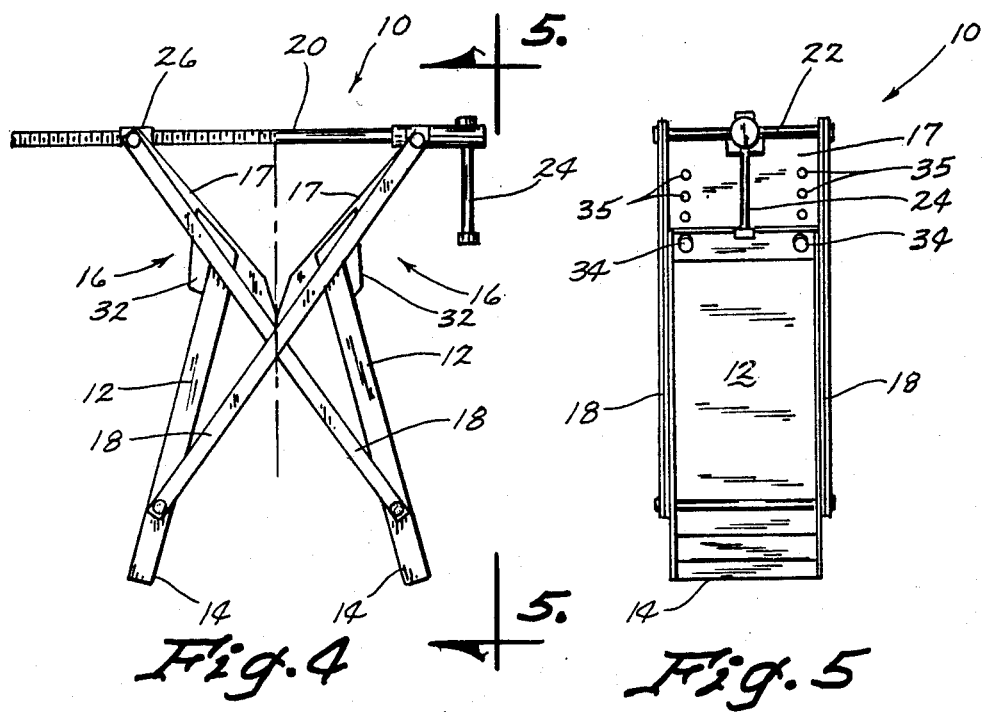
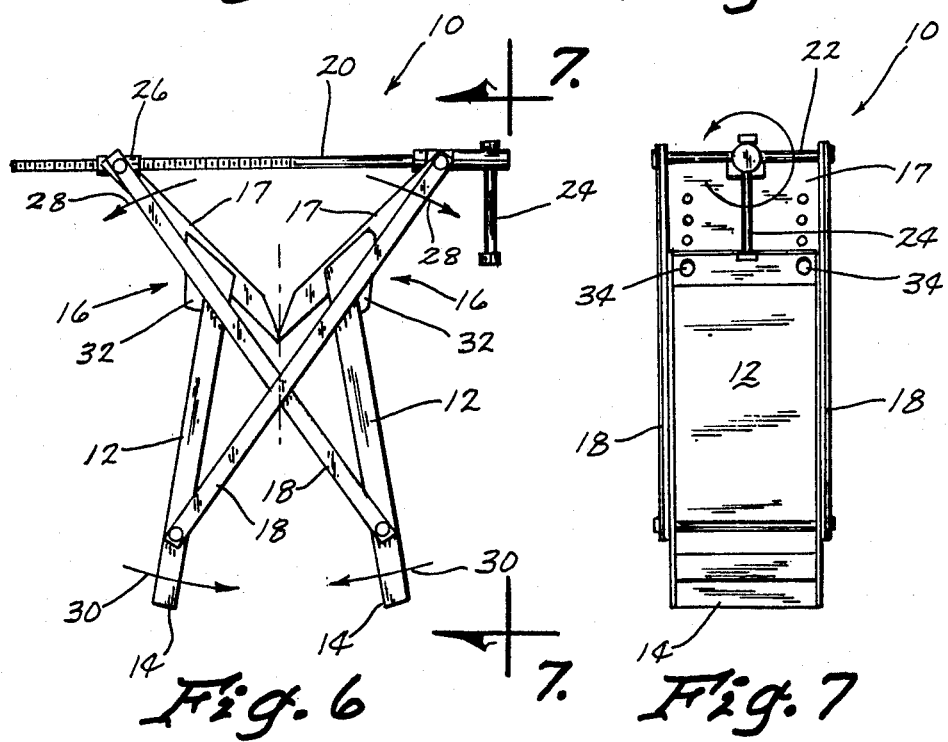

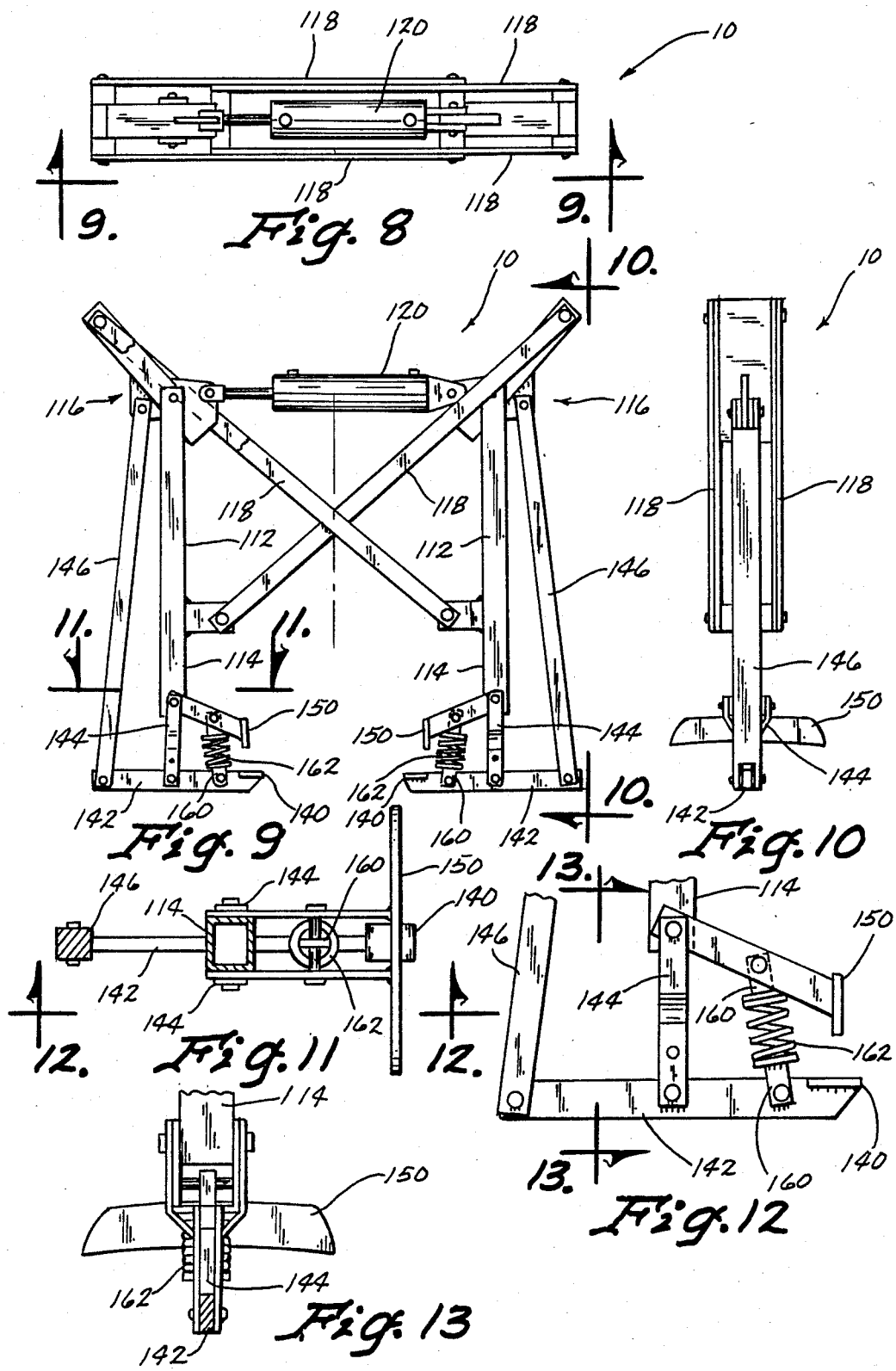

CLAMPING DEVICE

TECHNICAL FIELD

This invention relates to clamping devices and more particularly to a clamping device wherein the leverage is progressively increased as the clamp is closed, and the clamped device is held in a squared position.

BACKGROUND OF THE INVENTION

Clamping devices have been widely used in numerous applications to secure a workpiece while a specific operation or operations are performed by the workman. A typical clamping device includes a pair of jaws disposed to contact and secure a workpiece and a force exerting element, such as a screw or hydraulic cylinder used to move the jaws toward engagement with the workpiece. Generally, the forces applied to the workpiece are evenly applied although the resistance of the workpiece is progressively increased as the clamp is closed.

Those concerned with this and other problems recognize the need for an improved clamping device.

DISCLOSURE OF THE INVENTION

The present invention provides a clamping device including a pair of counter-opposing jaws interconnected by a pair of connecting straps and a force exerting element. Each connecting strap has one end attached to one of the jaws and the other end attached to the other of the jaws such that the straps intersect. The point of intersection of the connecting straps moves progressively closer to the workpiece held between the jaws as the jaws are closed. In one embodiment the clamping device is adapted for use as a portable tire bead breaker suitable for use on large truck or tractor tires.

An object of the present invention is the provision of an improved clamping device.

Another object is to provide a clamping device wherein the force applied to the workpiece is progressively increased as the jaws of the clamp are closed on the workpiece, whereby less stress is exerted on the clamping device by the application of less force to effect the clamping action.

A further object of the invention is the provision of a clamping device suitable for use as a portable tire bead breaker.

Still another object is to provide a portable tire bead breaker that applies equal simultaneous pressure to both sides of the tire.

A still further object of the present invention is the provision of a tire bead breaker that is easily adapted to tires of different sizes.

Yet another object is to provide a tire bead breaker that is rugged in construction, inexpensive to manufacture and easy to operate.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of one embodiment of the clamping device of the present invention;

FIG. 2 is a top plan view taken along line 2—2 of FIG. 1;

FIG. 3 is an enlarged front elevation sectional view taken along line 3—3 of FIG. 2;

FIG. 4 is a front elevational view taken along line 4—4 of FIG. 2;

FIG. 5 is a side elevational view taken along line 5—5 of FIG. 4;

FIG. 6 is a front elevational view similar to FIG. 4 but showing the jaws of the clamping device moved closer to one enother;

FIG. 7 is a side elevation view taken along line 7—7 of FIG. 6;

FIG. 8 is a top plan view of another embodiment of the clamping device of the present invention adapted for use to break the seal between a tire bead and the wheel rim upon which the tire is mounted;

FIG. 9 is a front elevational view thereof taken along line 9—9 of FIG. 8.

FIG. 10 is a side elevational view taken along line 10—10 of FIG. 9.

FIG. 11 is an enlarged sectional view taken along line 11—11 of FIG. 9;

FIG. 12 is a front elevational cut-away view taken along line 12—12 of FIG. 11;

FIG. 13 is a side elevation sectional view taken along line 13—13 of FIG. 12.

BEST MODE FOR CARRYING OUT THE INVENTION

Figure 14:
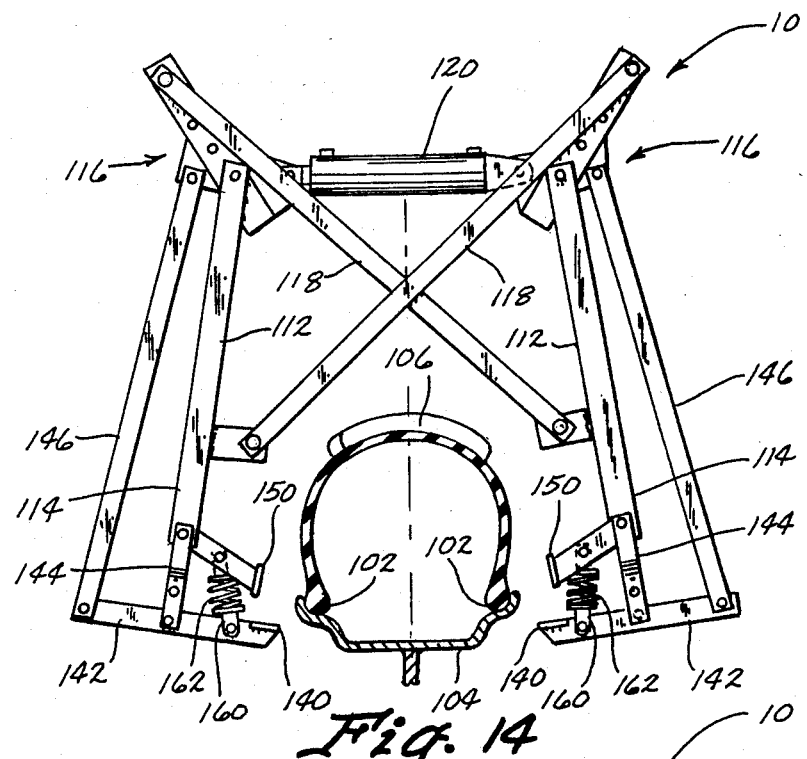
FIG. 14 is a front elevational view similar to FIG. 9 showing the clamping device positioned to engage a wheel mounted tire.

Referring now to the drawings, wherein like reference numerals designate identical or corresponding parts throughout the several views, FIG. 1 shows the clamping device of the present invention generally designated by the reference numeral (10). The clamping device (10) includes a pair of counter-opposing elongated beams (12) each having a forward jaw portion (14) and a rearward portion (16). A pair of connecting straps (18) are pivotally attached to and interconnect the beams (12). Each connecting strap (18) has one end attached to one of the forward jaw portions (19) to (14) and the other end attached to the rearward portion (16) of opposing beam (12) such that the connecting straps (18) intersect. A force exerting element or screw (20) is pivotally attached to pins (22) and interconnects the rearward portion (16) of beams (12). The screw (20) is rotated by handle (24) to cause the screw (20) to travel within the nut (26) thereby exerting the required force to cause the rearward portions (16) to move away from each other and the jaw portions (14) to move toward each other as illustrated by the directional arrows (28 and 30) in FIG. 3.

As shown most clearly in FIG. 3, the rearward portions (16) carry a channel (32) that extends outwardly from the beams (12). A stub beam (17) is slidably received within the channel (32) and is selectively secured in one of a number of laterally adjusted positions by fasteners (34) engaging registrable openings (35). Lateral adjustment of the stub beams (17) is illustrated by directional arrows (36).

Referring now to FIGS. 4 and 6, it can be seen that as the screw (20) is moved from the retracted position (FIG. 4) toward the extended position (FIG. 6), the jaw portions (14) are moved between an opening mode and closing mode, and the intersection of the connecting arms (18) moves toward the jaw portions (14). When the intersection of the connecting rods (18) moves toward the jaw portions (14), the force exerted in the jaws (14) is progressively increased since the efficiency of the lever arm is increased.

FIGS. 8–15 illustrate an embodiment of the clamping device (10) that is adapted for use to break the seal between a tire bead (102) and a wheel rim (104) upon which a tire (106) is mounted. Similar to the embodiment of FIGS. 1–7, this embodiment includes a pair of beams (112) each including a jaw portion (114) and a rearward portion (116). The beams (112) are connected by intersecting connecting straps (118) and a force exerting element or hydraulic cylinder (120).

Figure 15:
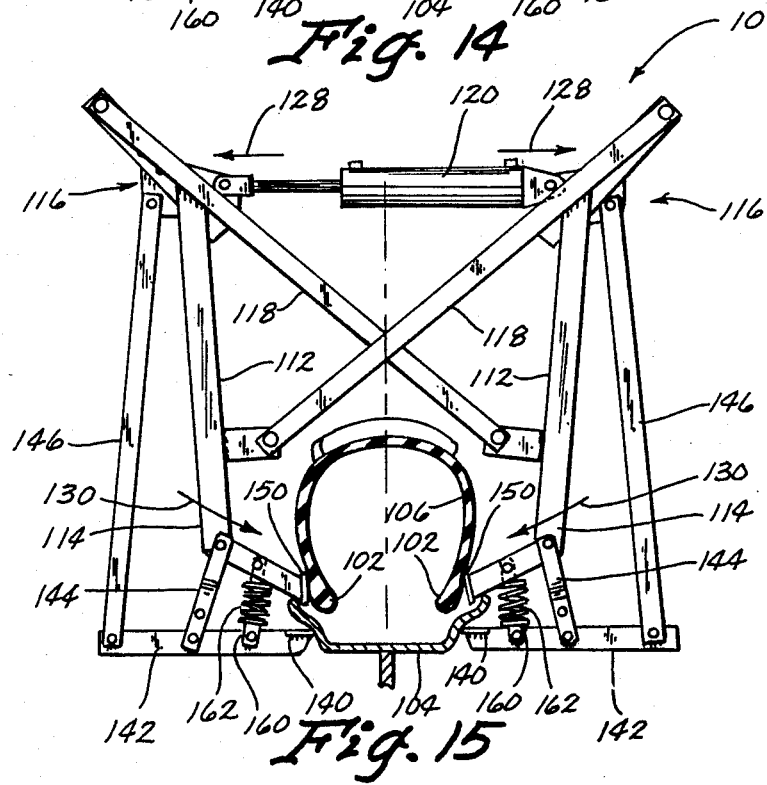
FIG. 15 is a front elevational view similar to FIG. 14 but showing the action of the clamping device to break the seal between the tire bead and the wheel rim.

The jaw portions (114) each carry a rim support (140) and a press foot (150) interconnected by a spacer strap (160). A compression spring (162) is disposed around each spacer strap (160) and acts to hold the press foot (150) back away from the wheel rim next to tire (106) as shown in FIG. 15. The rim support (140) is carried on a bar (142) which is pivotally connected to the jaw portion (114) by strap (144) and pivotally connected to the rearward portion (116) by strap (146).

As most clearly seen by reference to FIGS. 14 and 15, the clamping device (10) is positioned so that the jaw portions (114), are disposed to the sides of the tire (106). As the hydraulic cylinder (120) is extended as indicated by the directional arrows (128) the jaw portions (114) move toward the tire (106) as shown by directional arrows (130). The rim supports (140) contact opposite sides of the wheel rim (104) and the press feet (150) contact opposite sides of the tire (106) immdiately above the tire bead (102). Force is evenly applied simultaneously to both sides of the tire (106) to break the seal between the tire bead (102) and the rim (104). The force applied by the press feet (150) is progressively increased as the jaws (114) close since the lever arm efficiency progressively increases. Since force is applied to the workpiece from opposite sides both equally and simultaneously, the workpiece is held in a square position with respect to the device and has no tendency to twist or turn.

Thus it can be seen at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. A clamping device, comprising,
   a pair of spaced elongated upright beam members having upper and lower ends,
   a stub beam member having upper and lower ends with the lower end thereof adjustably slidably connected to the upper ends of said elongated upright beam members, said stub beam members extending upwardly and outwardly from the upper ends of said upright beam members,
   elongated overlapping connecting straps pivotally connecting the upper end of one stub beam member to the lower end of the opposite elongated upright beam member,
   a screw member movably secured to the upper ends of said stub beam members, and being adapted to move the upper ends of said stub beam members towards or away from each other upon being rotated in opposite directions, whereupon the lower ends of said upright beam members will correspondingly move away or towards each other.

* * * * *